United States Patent
Glickman et al.

(10) Patent No.: US 8,306,011 B2
(45) Date of Patent: Nov. 6, 2012

(54) METHOD AND DEVICE FOR MANAGING MULTI-FRAMES

(75) Inventors: Eran Glickman, Reshon Letzion (IL); Oren Gelberg, Natanya (IL); Dan Ilan, Hertzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 1166 days.

(21) Appl. No.: 12/094,124

(22) PCT Filed: Nov. 17, 2005

(86) PCT No.: PCT/IB2005/053807
§ 371 (c)(1),
(2), (4) Date: May 16, 2008

(87) PCT Pub. No.: WO2007/057727
PCT Pub. Date: May 24, 2007

(65) Prior Publication Data
US 2009/0046700 A1 Feb. 19, 2009

(51) Int. Cl.
*H04J 3/06* (2006.01)
(52) U.S. Cl. .......................... 370/350; 455/450; 398/41
(58) Field of Classification Search .................. 370/350, 370/445; 340/310.01; 709/445
See application file for complete search history.

(56) References Cited

U.S. PATENT DOCUMENTS

| 4,855,996 | A | 8/1989 | Douskalis |
| 6,167,059 | A | 12/2000 | Hagai et al. |
| 6,349,331 | B1 * | 2/2002 | Andra et al. .................. 709/220 |
| 6,771,630 | B1 | 8/2004 | Weitz et al. |
| 7,623,542 | B2 * | 11/2009 | Yonge et al. .................. 370/445 |
| 2004/0227623 | A1 * | 11/2004 | Pozsgay .................. 340/310.01 |

FOREIGN PATENT DOCUMENTS

JP 1990075235 3/1990
* cited by examiner

*Primary Examiner* — Robert Wilson
*Assistant Examiner* — Lionel Preval

(57) ABSTRACT

A device includes a processor and a time slot assigner, connected to a communication line via a physical layer unit. The physical layer unit is adapted to generate a communication line clock signal and a multi-frame synchronization signal. The device also includes a transmit media access controller (MAC) adapted to receive the multi-frame synchronization signal and the communication line clock signal and in response to scan, during a single multi-frame transmission period, multiple transmit MAC memory entry groups such as to retrieve transmission instructions and in response to enable access to the communication line. During a single multi-frame transmission period the transmit MAC accesses at least twice at least one transmit MAC memory entry group. The processor receives a processor clock signal that differs from the communication line clock signal. The MAC also performs reception operations using receive clock and sync signals.

20 Claims, 11 Drawing Sheets

METHOD AND DEVICE FOR MANAGING MULTI-FRAMES

FIELD OF THE INVENTION

The invention relates to a device having multi-frame management capabilities and to a method for multi-frame management.

BACKGROUND OF THE INVENTION

In today's telecommunications, digital networks transport large amounts of information. Network services can be, for example, traditional voice phone, facsimile, television, audio and video broadcast, and data transfer.

With the increasing need of information exchange in the global society, the capacity of existing and future networks must be used efficiently. Multiplexers switch different network services to a single network in such a way that every service is fully maintained and does not disturb other services.

Communication integrated circuits use various techniques, such as time division multiplexing (TDM), to transmit information from multiple communication channels over a single communication line, as well as to receive information the is destined to many communication channels.

Exemplary communication integrated circuits and TDM methods are illustrated in U.S. Pat. No. 6,771,630 of Weitz et al., and U.S. Pat. No. 6,167,059 of Hagai et al., both being incorporated herein by reference. An exemplary TDM scheme is illustrated in U.S. Pat. No. 4,855,996 of Douskalis.

The multiple communication channels are organized in frames. Simple TDM frames are just duplicated over time. Thus, the content of a certain frame (the allocation of time slots within the frame) remains the same over long periods. Recently, there is a need to define multi-frames that are characterized by including repetitions of multiple different frames.

These multi-frames are usually transmitted or received over channels that require highly accurate time division multiplexing and synchronization.

There is a need to provide efficient methods for multi-frame management and to provide a device having multi-frame management capabilities.

SUMMARY OF THE PRESENT INVENTION

A device having multi-frame management capabilities and a method for managing multi-frames.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
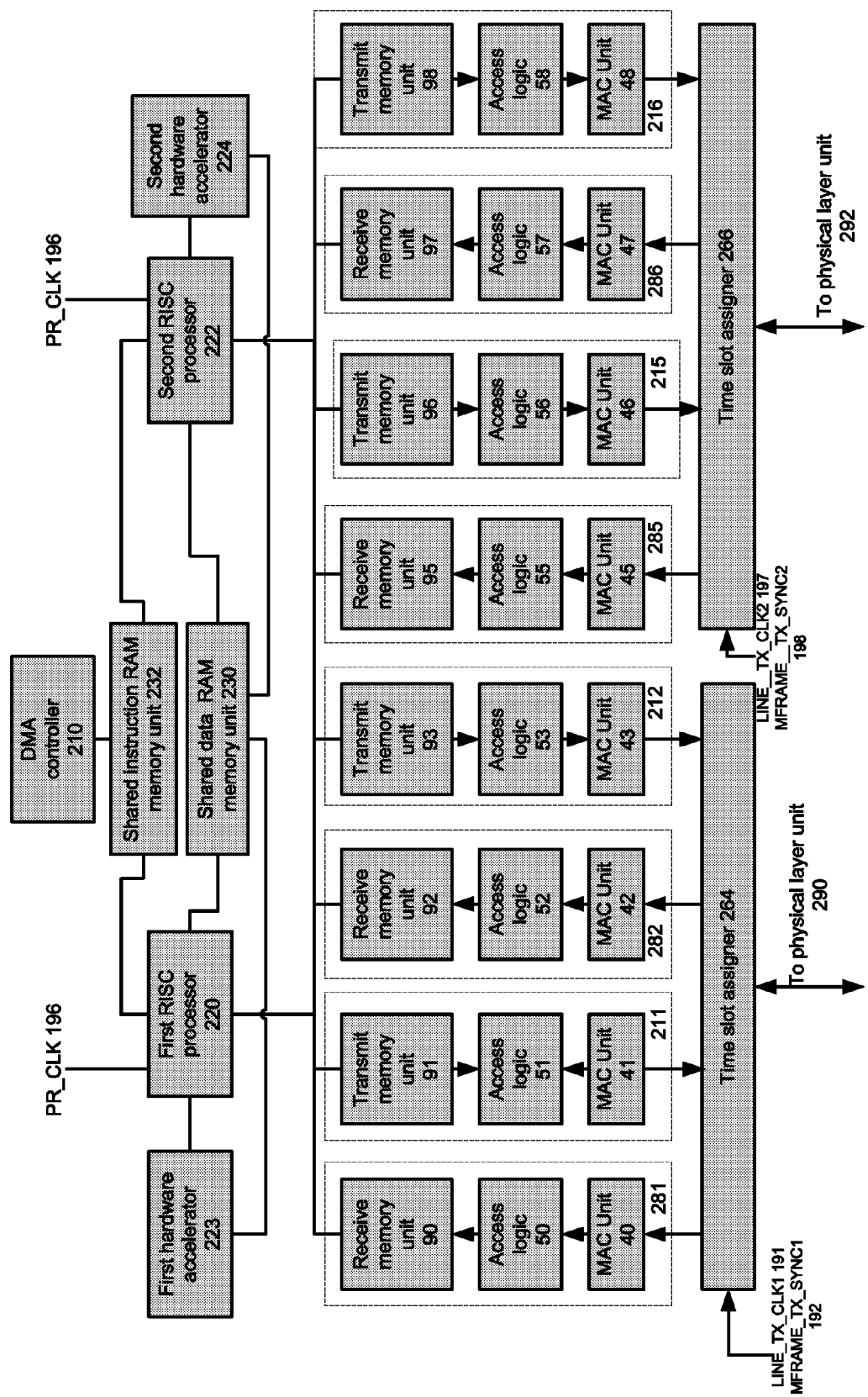
FIG. 1 illustrates a device, according to an embodiment of the invention.

The invention provides a device having multi-frame management capabilities and a method for managing multi-frames. The device can control (manage) the transmission and/or the reception of multi-frames.

According to an embodiment of the invention the device includes one or more processors that are adapted to generate transmission instructions and/or reception instructions. The one or more processors are usually not synchronized with the communication line, but a media access controller is synchronized with the communication line and can execute transmission and/or reception instructions that enable the transmission and/or reception of multi-frames. Transmission instructions are organized in transmit MAC memory entry groups, whereas each group stores transmission instructions that control a transmission of a frame. A multi-frame is transmitted by scanning multiple transmit MAC memory entry groups, while at least one transmit MAC memory entry group is scanned multiple times during a single multi-frame period.

Reception instructions are organized in receive MAC memory entry groups, whereas each group stores reception instructions that control a reception of a frame. The reception process defined which received signals belong to which communication channel. A multi-frame is received by scanning multiple receive MAC memory entry groups, while at least one receive MAC memory entry group is scanned multiple times during a single multi-frame period.

Conveniently, transmit and/or receive MAC memory entry groups may be located in a time slot assigner in order to allow the interleaving of data from multiple media access controllers.

According to an embodiment of the invention the transmission of multi-frames is executed by components that also receive multi-frames. It is noted that different clock signals (as well as synchronization signals) can be used for transmission and reception, that the same communication line can convey bi-directional traffic, but this is not necessarily so.

For simplicity of explanation most of the following description refers to transmission of multi-frames although it can be applied mutatis mutandis to reception of multi-frames. For example, various signals that are mentioned below (such as MFRAME_TX_SYNC1, MFRAME_TX_SYNC2, LINE_TX_CLK1, LINE_TX_CLK2) are used to clock transmission paths and to synchronize the transmission of multi-frames. Conveniently, other (analogues) signals are used to synchronize and to clock reception paths. These latter signals (such as LINE_RX_CLK1, MFRAME_RX_SYNC1 and IFRAME_RX_SYNC1) are illustrated only in FIG. 9, for convenience of explanation.

It is further noted that the number of synchronizing signals and clock signals can be responsive to the number of ports that are controlled by the device. For example, if a certain media access controller controls eight TDM ports then one till eight different clocking and multi-frame synchronizing signals can be used in each direction, for example, in an eight TDM line configuration, up to 16 at a whole.

It is noted that a single media access controller can operate both as a transmit media access controller and as a receive media access controller but this is not necessarily so. In addition the reception and transmission can occur in parallel to each other or in a sequential manner.

According to an embodiment of the invention the device includes a processor and is connected to a communication line via various components such as a physical layer unit. The physical layer unit is adapted to generate a communication line transmission clock signal (LINE_TX_CLK1 191) and a multi-frame transmission synchronization signal (MFRAME_TX_SYNC1 192). The device further includes a media access controller (also referred to as a time slot assigner) that is connected to the physical layer unit via a time slot assigner that may be the routing element. The media access controller is adapted to receive MFRAME_TX_SYNC1 192 and LINE_TX_CLK1 191 and in response to scan, during a single multi-frame period, multiple transmit MAC memory entry groups such as to retrieve transmission instructions and in response to enable access to the communication line. Each transmit MAC memory entry group stores transmission instructions that control the transmission of a frame. During a single multi-frame transmission period the MAC accesses multiple times one or more transmit MAC memory entry groups. The processor is adapted to generate the multiple transmission instructions and is also adapted to receive a processor clock signal PR_CLK that differs from LINE_TX_CLK1.

FIG. 1 illustrates a device 10, according to an embodiment of the invention.

The device 10 is adapted to assemble and disassemble time division multiplexed (TDM) lines. Device 10 is adapted to use routing tables in order to support a large number of TDM lines.

Device 10 includes two RISC processors 220 and 222, a shared data RAM memory unit 230, a shared instruction RAM memory unit 232, direct memory access (DMA) controller 210, multiple receive and transmit MAC layer units (also referred to as MAC units) 40-48, multiple receive and transmit memory units 90-98 and associated access logics 50-58.

The first and second RISC processors 220 and 222 can access the shared data RAM memory unit 230 and a shared instruction RAM memory unit 232. These RISC processors can be accessed using schedulers (not shown), but this is not necessarily so.

The first RISC processor 220 is connected to a first hardware accelerator 223 and to multiple receive and transmit memory units 90-98. The second RISC processor 222 is connected to a second hardware accelerator 224 and to multiple receive and transmit memory units 90-98. The hardware accelerators 223 and 224 can perform various mathematical functions such as searching for a match within a small memory entry group, finding a maximum value or a minimum value within an array of number and the like. These accelerators are optional.

According to an embodiment of the invention the device can include processors that are not RISC processors, instead of RISC processors 220 and 222.

Conveniently, both RISC processors 220 and 222 receive the same clock signal PR_CLK, but this is not necessarily so. These RISC processors usually manage multiple tasks and communicate with multiple components of device 10. Usually, neither one of RISC processors 220 and 222 is synchronized with the clock of each communication line connected to device 10.

According to an embodiment of the invention the first RISC processor 220 is connected to receive memory units 90 and 92 and to transmit memory units 91 and 93. The second RISC processor 222 is connected to receive memory units 95 and 97 and to transmit memory units 96 and 98. The RISC processors 220 and 222 can operate independently from each other, but they can also cooperate with each other thus sharing the MAC units and can controlling them together.

Receive memory units such as units 90, 92, 95 and 97 receive data segments and data segment write requests from data sources. They decide which data segments to provide to the RISC processors 220 and 222. The data segments are eventually read by RISC processors 220 and 222. The receive memory units can receive status information from data sources. This status information can be related to data to be transmitted from device 10 to data targets.

Receive memory unit 90, access logic 50 and MAC unit 40 form first reception path 281. Receive memory unit 92, access logic 52 and MAC unit 42 form second reception path 282. Transmit memory unit 91, access logic 51 and MAC unit 41 form a first transmission path 211. Transmit memory unit 93, access logic 53 and MAC unit 43 form a second transmission path 212.

The first and second transmission paths 211 and 212 and the first and second reception paths 281 and 282 are connected to time slot assigner 264. These paths are connected to physical layer unit 290 via additional components that are not illustrated in FIG. 1 (such as communication interfaces and ports).

The physical layer unit 290 is connected to communication line 20. The physical layer unit 290 can be included within device 10 but this is not necessarily so. It is noted that each path can be connected to a separate physical layer unit, or that a pair of paths can be connected to a physical layer unit. It is further noted that a physical layer unit is usually connected to one or more reception path as well as to one or more transmission path.

The physical layer unit 290 sends MAC units 41 and 43 a communication line clock signal LINE_TX_CLK1 191 that is used to synchronize the transmission from device 10 to the communication line 20. The physical layer unit 290 also sends a multi-frame synchronization signal MFRAME_TX_SYNC1 that indicates that a multi-frame should be transmitted.

Time slot assigner 264 can perform time division multiplexing between the transmission paths that are connected to it.

Receive memory unit 95, access logic 55 and MAC unit 45 form a third reception path 285. Receive memory unit 97, access logic 57 and MAC unit 47 form a fourth reception path 286. Transmit memory unit 96, access logic 56 and MAC unit 46 form a third transmission path 215. Transmit memory unit 98, access logic 58 and MAC unit 48 form a fourth transmission path 216.

The third and fourth transmission paths 215 and 216 and the third and fourth reception paths are connected to second time slot assigner 266. These paths are connected to second physical layer unit 292 via additional components that are not illustrated in FIG. 1 (such as communication interfaces and ports). It is noted that each path can be connected to a separate physical layer unit, or that a pair of paths can be connected to a single physical layer unit.

Every MAC unit has an internal memory unit and includes an internal memory unit that can store channel information from multiple communication channels. These MAC units are also adapted to receive transmission instructions from time slot assigner 264 and in response enable the transmission of information from the transmission paths that are connected to it, same for reception.

Figure 2:
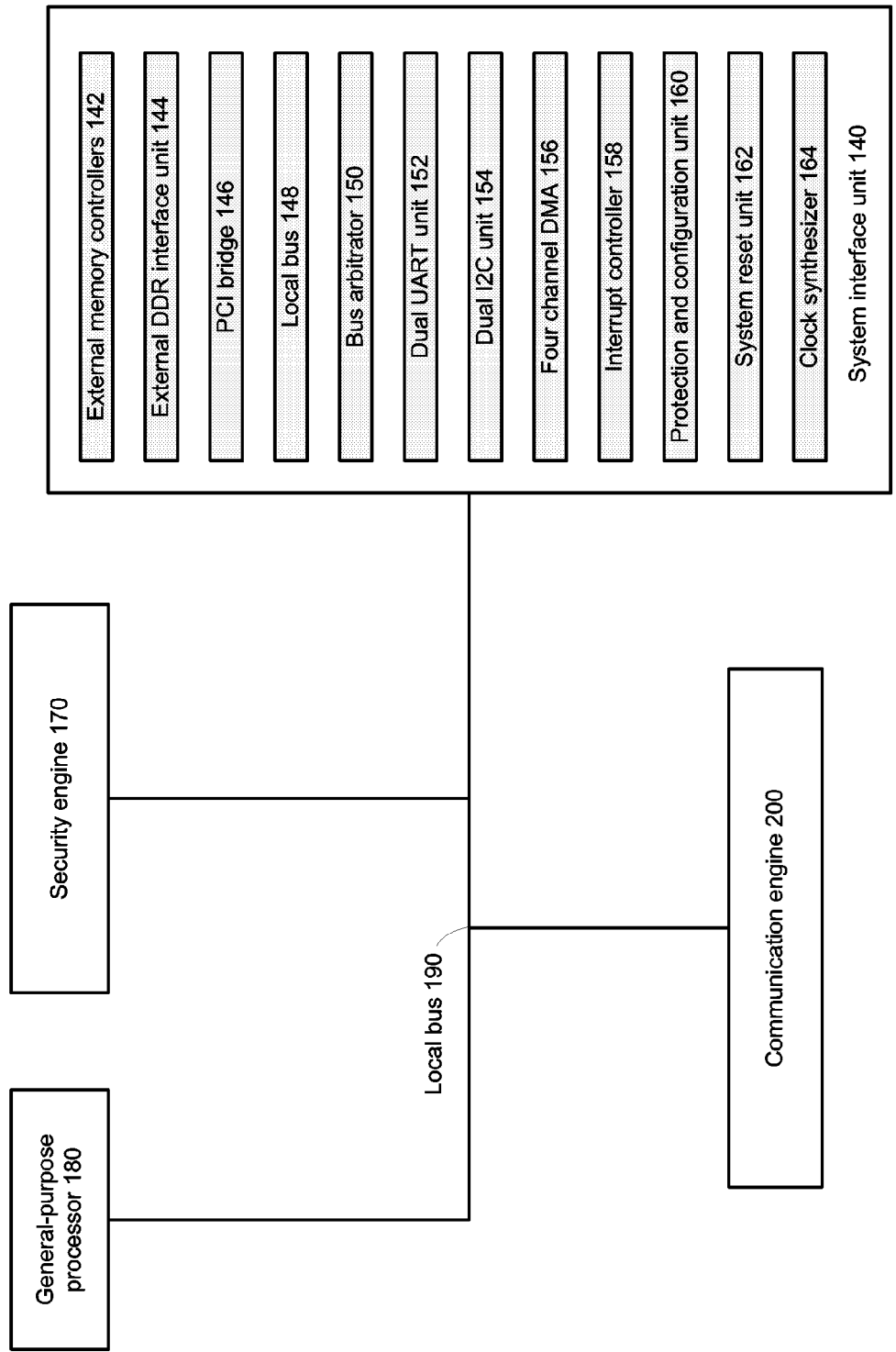
FIG. 2 illustrates a device according to another embodiment of the invention.

FIG. 2 illustrates a communication device 10, according to an embodiment of the invention.

Communication device 10 includes a general-purpose processor 180, a security engine 170, system interface unit 140, communication engine 200 and multiple ports (not shown). Components 180, 170, 140 and 200 are connected to each other by central bus 190.

The general-purpose processor 180 can include multiple execution units such as but not limited to an integer unit, a branch processing unit, a floating point unit, a load/store unit and a system register unit. It can also include various cache memories, dynamic power management unit, translation look aside buffers, and the like.

The general-purpose processor 180 controls the communication device 10 and can execute various programs according to the required functionality of communication device 10. The general-purpose processor 180 can be a member of the PowerPC™ family but this is not necessarily so.

The security engine 170 can apply various security mechanisms including encryption based mechanisms and the like.

Communication device 10 can be connected to multiple memory units as well as other components. These components are interfaced by system interface unit 140. System interface unit 140 may include some of the following components: external memory controllers 142, external DDR interface unit 144, PCI bridge 146, local bus 148, bus arbitrator 150, Dual UART unit 152, dual 12C unit 154, a four channel DMA 156, interrupt controller 158, protection and configuration unit 160, system reset unit 162 and clock synthesizer 164. It is noted that other interfacing components can be used.

Figure 3:
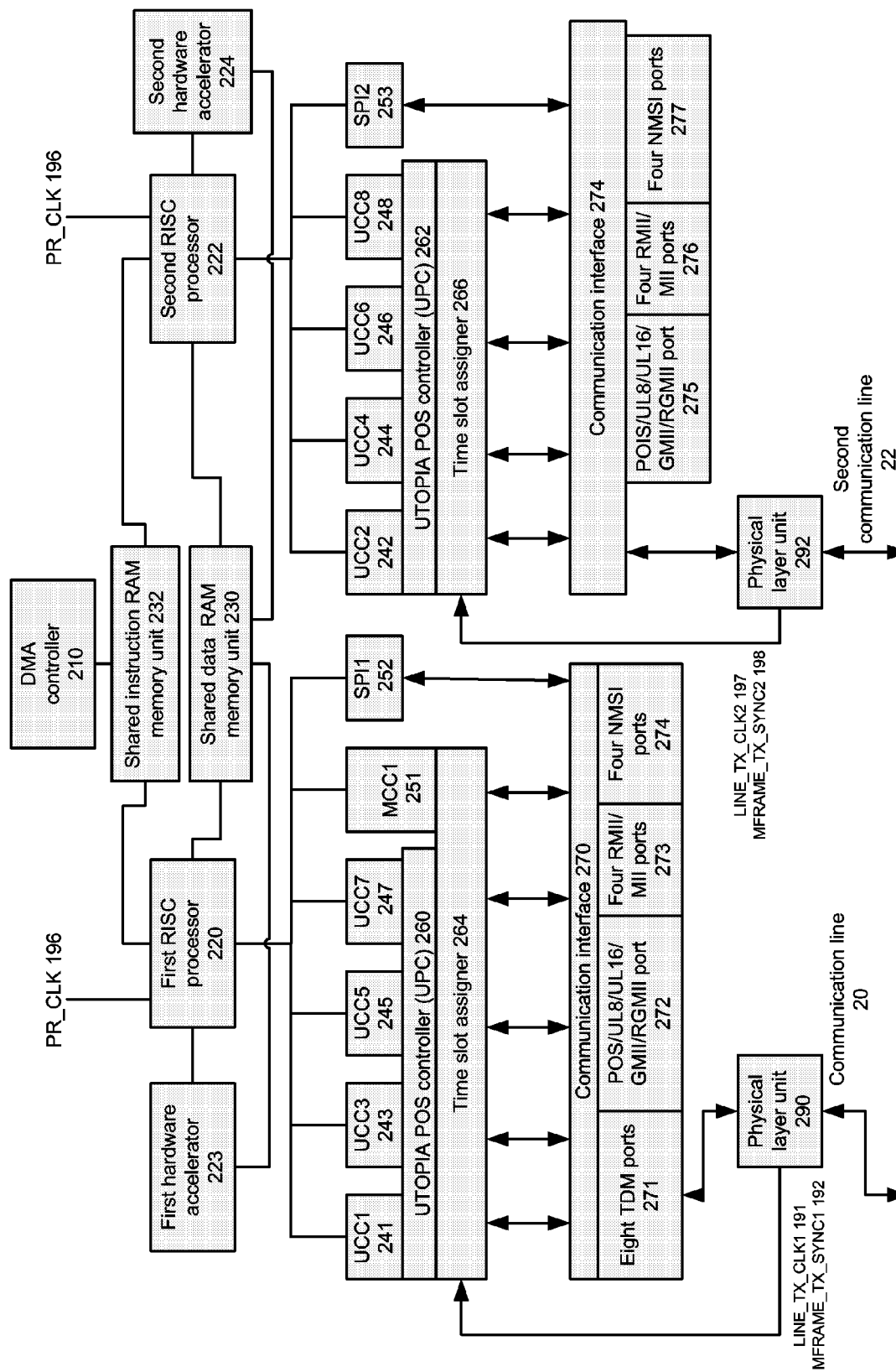
FIG. 3 illustrates a communication engine, according to an embodiment of the invention.

FIG. 3 illustrates a communication engine 200, according to an embodiment of the invention.

It is noted that FIG. 3 illustrates an embodiment of the invention and that other communication engines (including those who have a single processor or more than two processors) can be used.

The communication engine 200 is a versatile communication component that can manage multiple communication ports that operate according to different communication protocols.

The communication engine 200 includes two RISC processors 220 and 222, DMA controller 210, a shared data RAM memory unit 230, a shared instruction RAM memory unit 232, eight universal communication controllers denoted UCC1-UCC8 241-248, one multi-channel communication controller (MCC) 251, two serial peripheral interfaces denoted SP1-SP2 252-253, two UTOPIA POS controllers 261 and 262, two time slot assigners 264 and 266 and two communication interfaces 270 and 274. Time slot assigner 264 assigns time slots for accessing communication interface 270. Time slot assigner 266 assigns time slots for accessing communication interface 274.

Each communication controller out of communication controllers UCC1-UCC8, MCC, and SPI1-SP2 can include transmission paths such as transmission paths 211, 212, 215 and 216 as well as reception paths such as reception paths 281, 282, 285 and 286. This is done by a connection made from Time Slot Assigner 264 to Time Slot Assigner 266. In the second embodiment of the communication controller there is support for 8 TDM lines instead of 4 in the first embodiment of device 10, the number can be altered in any architecture.

Conveniently, UCC1 241, UCC3 243, UCC5 245 and UCC7 247 can be controlled by UTOPIA POS controller 260, and that these controllers as well as MCC 251 can access the communication interface 270 (and eventually communication line 20) in response to transmission instructions sent by time slot assigner 264. It is further noted that some of these controllers can selectively bypass the time slot assigner 264.

Conveniently, UCC2 242, UCC4 244, UCC6 246 and UCC8 248 can be controlled by UTOPIA POS controller 262, and that these controllers can access the second communication interface 274 (and eventually second communication line 22) in response to transmission instructions sent by time slot assigner 266. It is further noted that some of these controllers can selectively bypass the time slot assigner 266 but are also connected to Time slot assigner 264 so they will be to be connected to TDM ports 271.

The first communication interface 270 is connected to multiple time division multiplex (TDM) ports that are collectively denoted 271, a UTOPIA-packet over SONET (POS) port 272, as well as four RMII ports collectively denoted 273, and four NMSI ports collectively denoted 274.

The second communication interface 274 is connected to another UTOPIA-packet over SONET (POS) port 275, four RMII ports collectively denoted 276, and four NMSI ports collectively denoted 274. It is noted that other communication protocols can be supported by communication device 10.

Conveniently, a UCC can support the following communication protocols and interfaces (not all simultaneously): 10/100 Mbps Ethernet, 1000 Mpbs Ethernet, IPv4 and IPv6, L2 Ethernet switching using, ATM protocol via UTOPIA interface, various types of HDLC, UART, and BISYNC.

Conveniently, MCC 251 supports two hundred and fifty six HDLC or transparent channels, one hundred and twenty eight SS#7 channels or multiple channels that can be multiplexed to one or more TDM interfaces.

In addition, the communication engine 200 can include a controller (not shown) as well as an interrupt unit that coordinate the various components of the communication engine, as well as to enable the communication engine 200 to communicate with general-purpose processor 180, security engine 170 and system interface unit 140.

Time slot assignor 264 receives LINE_TX_CLK1 191 and MFRAME_Tx_SYNC1 192 from the physical layer unit 290. Time slot assignor 266 receives LINE_TX_CLK2 197 and MFRAME_TX_SYNC2 198 from the physical layer unit 292.

Conveniently the both time slot assigners are connected to each other. This can allow UCC2 242, UCC4 244, UCC6 246 and UCC8 248 to access the first communication line 20.

Conveniently the multi-frame synchronization signals and the clock signals can be a common signal or per TDM, independent or common for receive and/or transmit.

Figure 4:
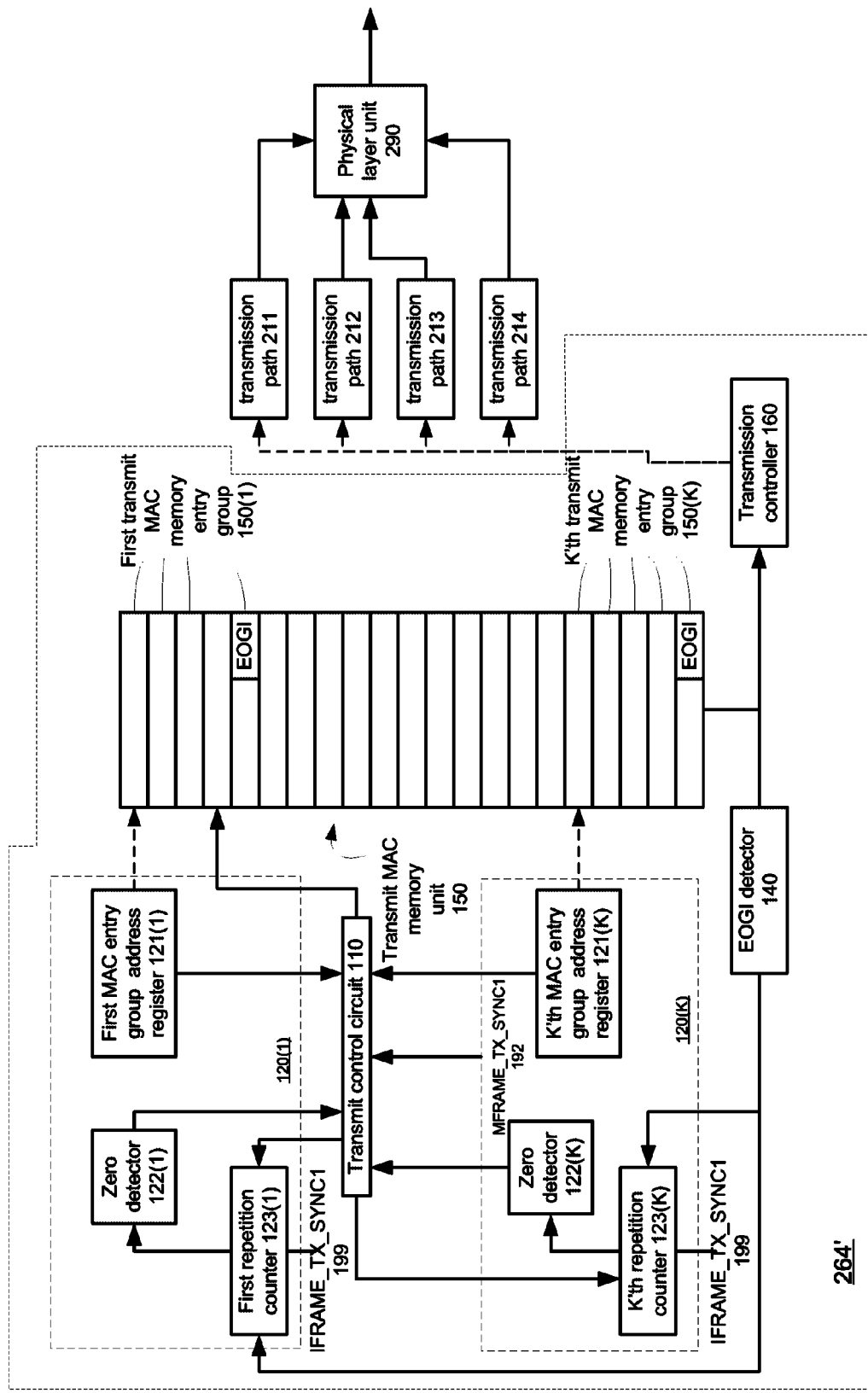
FIG. 4 illustrates a transmit media access controller, according to an embodiment of the invention.

FIG. 4 illustrates a transmit media access controller 264', according to an embodiment of the invention.

Transmit media access controller 264' can be included within time slot assigner 264. The time slot assigner 264 can include additional circuits such as but not limited to a media access control circuit that controls the reception of information from the communication line 20.

Media access controller 264' receives MFRAME_TX_SYNC1 192 and LINE_TX_CLK1 191 and in response scans, during a single multi-frame transmission period, multiple transmit MAC memory entry groups 150(1)-150(K) such as to retrieve transmission instructions and in response to enable access to the communication line. Each transmit MAC memory entry group 150(*k*) stores transmission instructions that control a transmission of a frame. During a single multi-frame transmission period the transmit media access controller 264' accesses at least twice one or more transmit MAC memory entry group.

Transmit media access controller 264' includes a transmit memory unit 150, a transmit control circuit 110, multiple transmit frame access circuits 120(1)-120(K), a transmission controller 160 and an end of group indicator (EOGI) detector 140.

The transmit control circuit 110 is connected to the multiple transmit frame access circuits 120(1)-120(K), and to the transmit memory unit 150. The transmit control circuit 110 scans, during a single multi-frame transmission period, multiple transmit MAC memory entry groups 150(1)-150(K). The retrieved transmission instructions are sent to EOGI detector 140 and to transmission controller 160.

Each transmit MAC memory entry group 150(*k*) stores transmission instructions that control a transmission of a frame. Index k ranges between 1 and K, whereas K represents the number of different frames that are included within a multi-frame. For simplicity of explanation only two transmit MAC memory entry groups are illustrated (the first and the K'th transmit MAC memory entry groups) but K can exceed two.

A typical transmit frame access circuits (120(*k*)) out of circuits 120(1)-120(K) is adapted to repetitively generate a media memory unit address sequence that corresponds to the address of entries that form an associated transmit MAC memory entry group (150(*k*)). The transmit control circuit 110 is adapted to select between the multiple transmit frame access circuits 120(1)-120(K).

Conveniently, each transmit MAC memory entry group (150(*k*)) ends by an end of group indicator (EOGI) and the EOGI detector 140 can detect an EOGI and in response notifies the transmit control circuit 110. Transmit control circuit 110 can receive this indication as well as other indications and can determine which is the next transmit MAC memory entry group to scan.

First transmit frame access circuit 120(1) includes a first transmit MAC entry group address register 121(1) that stores the address of the first entry of the first transmit MAC memory entry group 150(1). This address is sent to the transmit control circuit 110 whenever the transmit control circuit 110 starts to scan the first transmit MAC memory entry group 150(1). The transmit control circuit 110 scans the first transmit MAC memory entry group by 150(1) incrementing the addresses until the EOGI detector 140 detects that the end of the first transmit MAC memory entry group 150(1) was reached. Once it occurs the first repetition counter 123(1) updates its value to reflect that the first MAC entry group was scanned. The inventors used a count down counter that its content was compared to zero (by zero detector 122(1)) to indicate that a predefined number of scans of the first transmit MAC memory entry group was completed. Once the predefined number of scans is completed the first repetition counter 123(1) is updated to the initial predefined repetition number.

When the predefined number of scans of the first transmit MAC memory entry group 150(1) is completed the second transmit frame access circuit 120(2) is selected, and so on, until the K'th transmit frame access circuit 120(K) is selected by the transmit control circuit 110, and the K'th transmit MAC memory entry group 150(K) is scanned for a predefined number of times. After the K'th transmit MAC memory entry group 150(K) is scanned for a predefined number of times the transmission of the multi-frame ends and the transmit media access controller 264' waits to receive the next MFRAME_TX_SYNC1 192.

The memory outputs transmission instructions to the EOGI detector 140 and to transmission controller 160. The EOGI detector 140 looks for the EOGI field, while the transmission controller 160 sends transmission instructions to the transmission controller 160. The transmission controller 160 sends transmission instructions to transmission paths such as paths 211-214 and in response these transmission paths transmit information towards the physical layer unit 290. For simplicity of explanation communication interface 170 and TDM ports 271 were omitted from FIG. 5.

It is noted that the transmission instructions sent to transmission controller 160 can differ from the transmission instructions sent by the transmission controller 160 to the transmission paths. For example, if the transmission controller 160 is connected to each transmission path via a dedicated control line the transmission instructions sent by the transmission controller 160 to the transmission paths do not necessarily include transmission path identification information while conveniently the transmission instructions sent to the transmission controller 160 include such information. It is further noted that the changes can result from differences in the format of the transmission instructions. The transmission controller 160 can send only one transmission instruction at a time but this is not necessarily so. The transmission instructions can include transmission start time information, although this is not necessarily so. Conveniently, a transmission instruction defines the time slot allocated to each transmission path.

According to an embodiment of the invention a scanning of a transmit MAC memory entry group is synchronized by a synchronization signal MFRAME_TX_SYNC.

Figure 5:
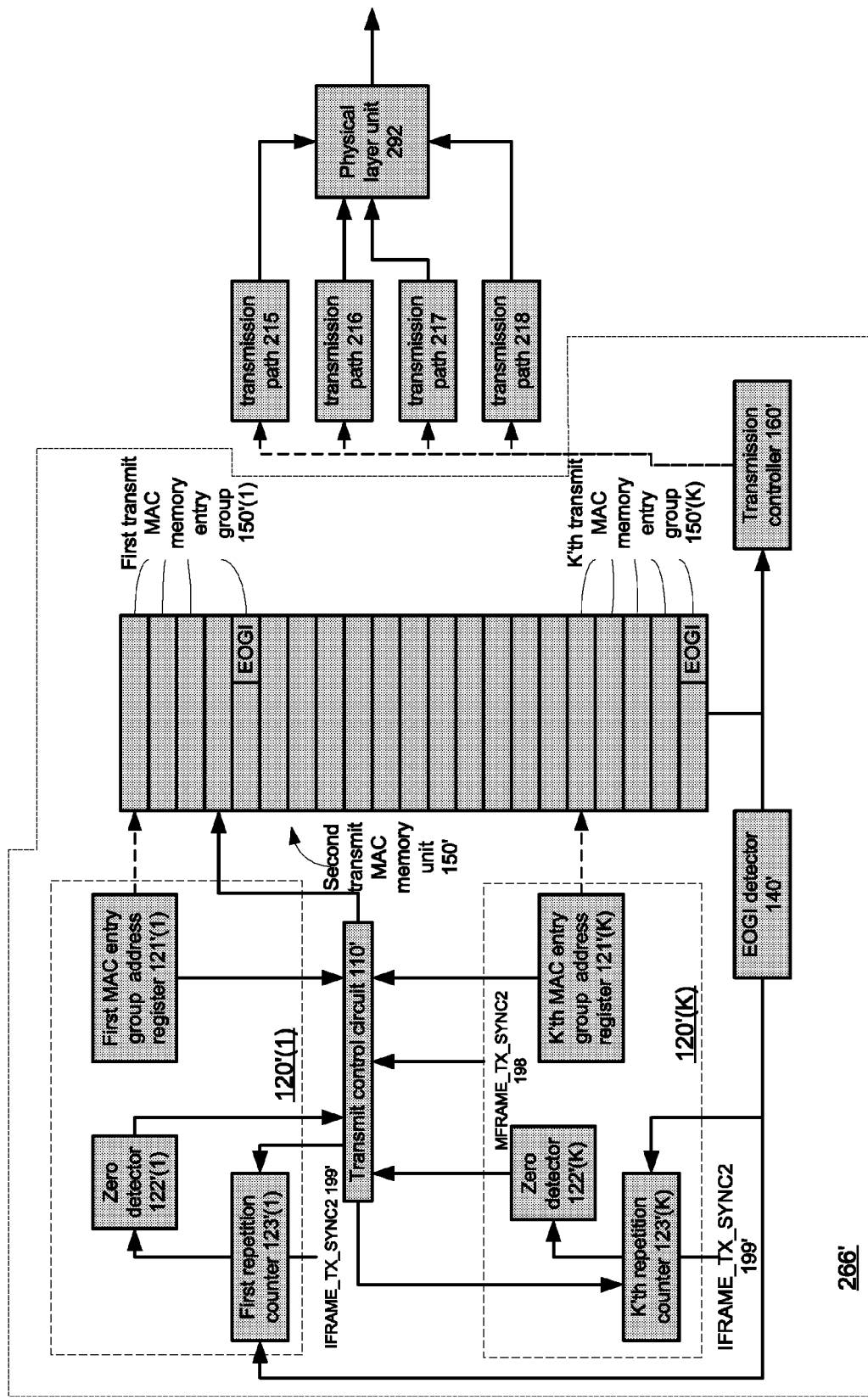
FIG. 5 illustrates a transmit media access controller, according to another embodiment of the invention.

FIG. 5 illustrates a transmit media access controller 266', according to another embodiment of the invention.

Transmit media access controller 266' can be included within time slot assigner 266. The time slot assigner 266 can include additional circuits such as but not limited to a media access control circuit that controls the reception of information from the communication line 20.

Transmit media access controller 266' is connected to transmission paths 215-218 that are connected (via at least one component) to physical layer unit 292.

Transmit media access controller 266' resembles transmit media access controller 264'. Both can operate at the same manner, independently from each other and in parallel to each other.

Media access controller receives LINE_TX_CLK2 197, MFRAME_TX_SYNC2 198 and optionally IFRAME_TX_SYNC2 199'.

Transmit media access controller 266' is also referred to as second transmit media access controller or second transmit MAC 266'. It includes a second transmit MAC memory unit 150', a second transmit control circuit 110', multiple transmit frame access circuits 120'(1)-120'(K), a second transmission controller 160' and a second end of group indicator (EOGI) detector 140'.

Figure 6:
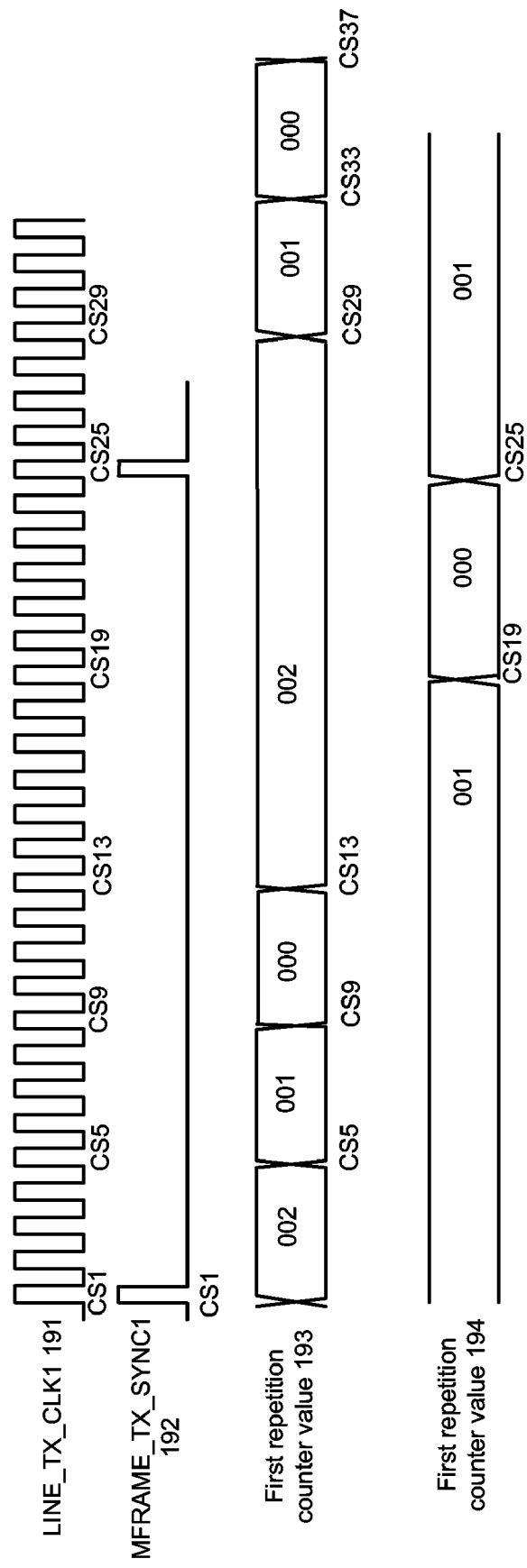
FIG. 6 is a timing diagram according to an embodiment of the invention.

FIG. 6 is a timing diagram of a transmission sequence, according to an embodiment of the invention.

For convenience of explanation it is assumed that K equals two, and that a multi-frame includes three repetitions of a first frame that is followed by two repetitions of a second frame. The first transmit memory entry group 150(1) stores transmission instructions that control the transmission of the first frame while a second transmit memory entry group 150(2) stores transmission instructions that control the transmission of the second frame.

It is further assumed that the transmission of the first frame is four clock cycle long while the transmission of the second frame is six clock cycles long. It is noted that the frames are usually much longer.

At a first cycle (CS1) of LINE_TX_CLK1 191 a multi-frame transmission starts, as indicated by the assertion of MFRAME_TX_SYNC1 192.

The value 193 of the first repetition counter 123(1) equals two, while the value 194 of the second repetition counter 123(2) equals one. The transmit control circuit 110 scans the first transmit MAC memory entry 150(1). The first scan of the first transmit MAC memory entry group 150(1) ends at the fourth clock cycle (CS4) of LINE_TX_CLK1 191, and at the following clock cycle (CS5) the value 193 of the first repetition counter 123(1) equals one. This indicates that the second scan of the first Transmit MAC memory entry group 150(1) is in progress.

The second scan of the first Transmit MAC memory entry group 150(1) ends at the eighth clock cycle of LINE_TX_CLK1 191, and at the following clock cycle (CS9) the value 193 of the first repetition counter 123(1) equals zero. This indicates that the third and last scan of the first transmit MAC memory entry group 150(1) is in progress.

The third scan of the first transmit MAC memory entry group 150(1) ends at the twelfth clock cycle of LINE_TX_CLK1 191, and at the following clock cycle (CS13) the value 193 of the first repetition counter 123(1) equals two. The value 194 of the second repetition counter 123(2) equals one. This indicates that the first scan of the second transmit MAC memory entry group 150(2) is in progress.

The first scan of the second transmit MAC memory entry group 150(2) ends at the eighteenth clock cycle of LINE_TX_CLK1 191, and at the following clock cycle (CS19) the value 194 of the second repetition counter 123(2) equals zero. This indicates that the second scan of the second Transmit MAC memory entry group 150(2) is in progress.

The second scan of the second transmit MAC memory entry group 150(2) ends at the twenty fourth clock cycle of LINE_TX_CLK1 191, and at the following clock cycle (CS25) a new MFRAME_TX_SYNC1 192 is received and the first Transmit MAC memory entry is scanned. The value 194 of the second repetition counter 123(2) is updated to one.

The value 193 of the first repetition counter 123(1) equals two, while the value 194 of the second repetition counter 123(2) equals one. The control circuit 110 scans the first Transmit MAC memory entry 150(1). The first scan of the first Transmit MAC memory entry group 150(1) (during the second multi-frame) ends at the twenty eighth clock cycle of LINE_TX_CLK1 191, and at the following clock cycle (CS29) the value 193 of the first repetition counter 123(1) equals one. This indicates that the second scan of the first Transmit MAC memory entry group 150(1) is in progress.

Figure 7:
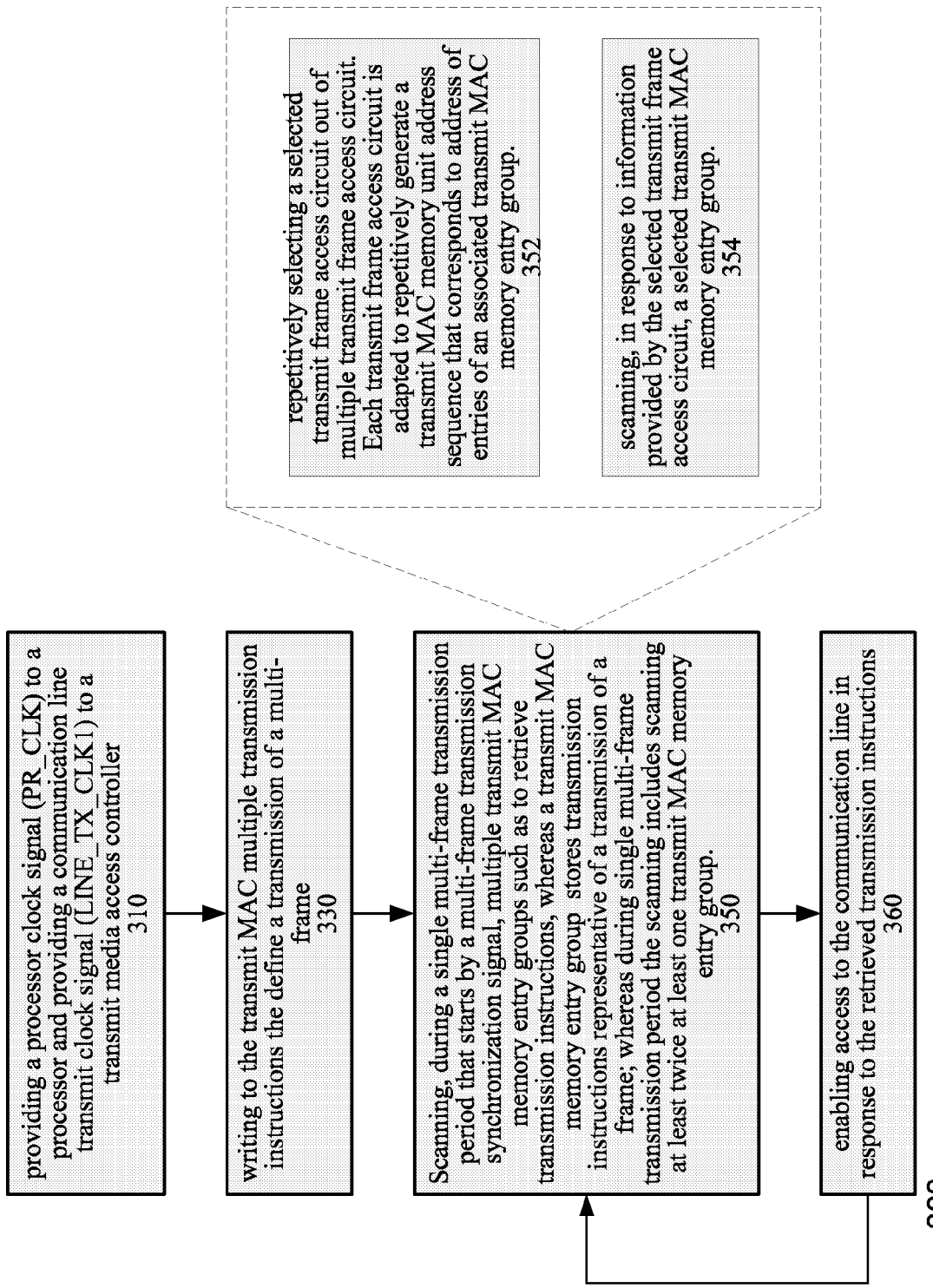
FIG. 7 is a flow chart of a method for transmitting multi-frames, according to an embodiment of the invention.

FIG. 7 is a flow chart of method 300 for transmitting multi-frames, according to an embodiment of the invention.

Method 300 starts by stage 310 of providing a processor clock signal PR_CLK 196 to a processor and providing a communication line transmit clock signal LINE_TX_CLK1 191 to a transmit media access controller, such as transmit media access controller 264'.

Stage 310 is followed by stage 330 of writing, to the transmit media access controller, multiple transmission instructions that control a transmission of a multi-frame. These transmission instructions define time windows allocated to transmitters.

Stage 330 is followed by stages 350 and 360.

Stage 350 includes scanning, during a single multi-frame transmission period (that conveniently starts by a transmit multi-frame synchronization signal MFRAME_TX_SYNC1), multiple transmit MAC memory entry groups such as to retrieve transmission instructions. A transmit MAC memory entry group stores transmission instructions that control a transmission of a frame. During a single multi-frame transmission period one or more transmit MAC memory entry groups are scanned multiple times.

Conveniently, stage 350 includes stage 352 of repetitively selecting a selected transmit frame access circuit out of multiple transmit frame access circuit. Each transmit frame access circuit is adapted to repetitively generate a transmit MAC memory unit address sequence that corresponds to address of entries of an associated Transmit MAC memory entry group. Stage 352 is followed by stage 354 of scanning, in response to information provided by the selected transmit frame access circuit, a selected transmit MAC memory entry group.

Conveniently, stage 350 includes searching for an end of group indicator (EOGI) indicative of an end of a currently scanned MAC entry group, and determining a next scanned Transmit MAC memory entry group in response to the detection of the EOGI.

Conveniently, stage 350 includes timing a scanning of at least one transmit MAC memory entry group in response to a reception of an intra-multi-frame transmit synchronization signal such as IFRAME_TX_SYNC1 199 and detection of the EOGI.

Stage 360 includes enabling, in response to the retrieved transmission instructions, access to the communication line. Conveniently, stage 360 includes sending transmission commands to multiple transmission paths (also referred to as transmitters) and conveying information provided by the multiple transmitters to the communication line.

Conveniently, stage 310 also includes providing a processor clock signal PR_CLK 196 to a second processor and providing a second communication line transmit clock signal LINE_TX_CLK2 197 to a second transmit media access controller. Stage 330 of writing further includes writing to the second transmit media access controller, multiple transmission instructions that control a transmission of a second multi-frame. Stage 350 of scanning further includes scanning, during a single multi-frame transmission period that starts by a second multi-frame synchronization transmit signal MFRAME_TX_SYNC2 198, multiple second transmit MAC memory entry groups such as to retrieve transmission instructions. Stage 360 further includes enabling, in response to the retrieved transmission instructions, access to a second communication line. A second Transmit MAC memory entry group stores transmission instructions that control a transmission of a frame. During single multi-frame period the scanning includes scanning at least twice at least one Transmit MAC memory entry group.

Figure 8:
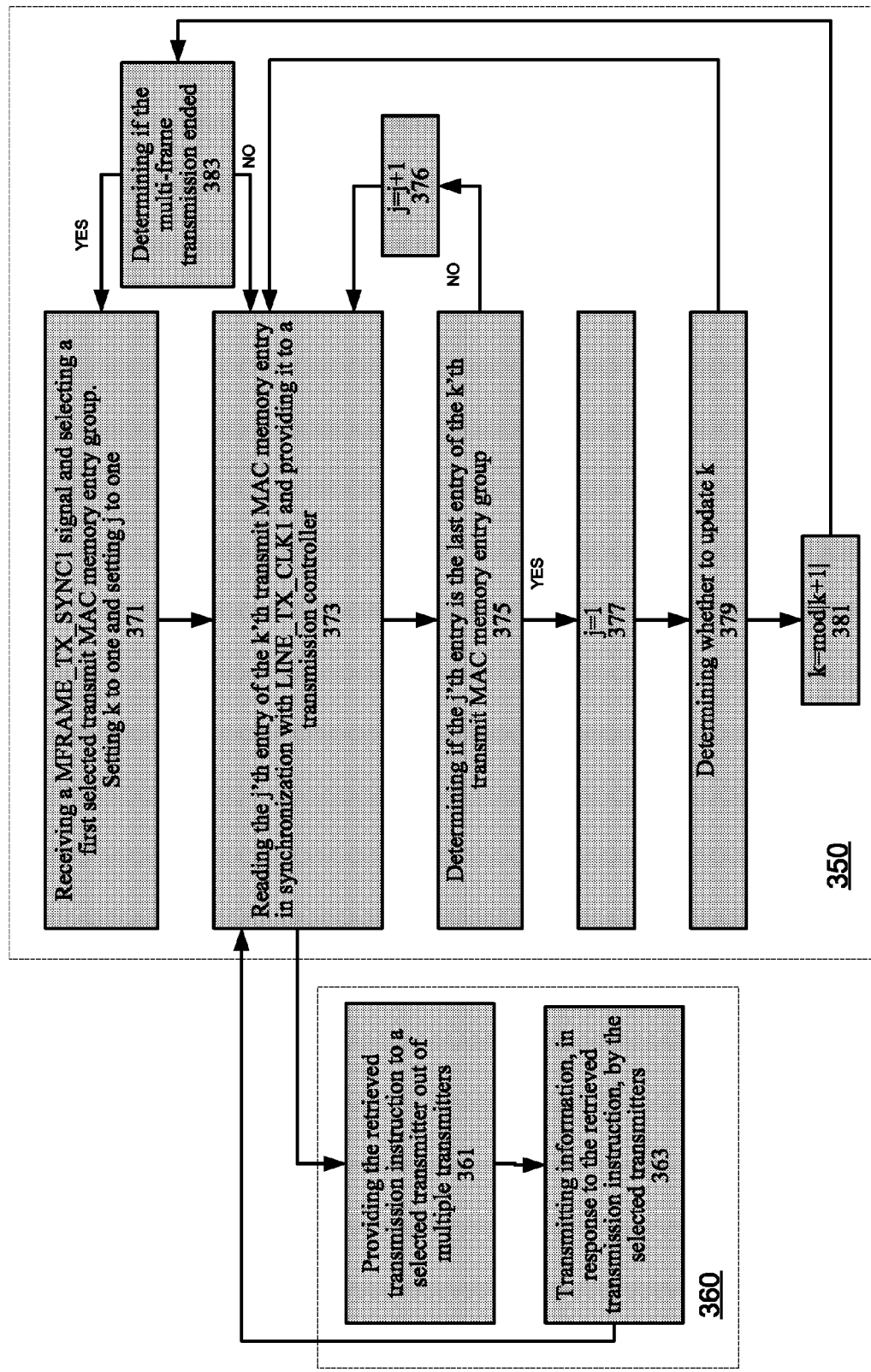
FIG. 8 illustrates various stages of the method for transmitting of multi-frames, according to an embodiment of the invention.

FIG. 8 illustrates various stages 350, 360 of method 300 for transmitting multi-frames, according to an embodiment of the invention.

Stage 350 starts by stage 371 of receiving MFRAME_TX_SYNC1 192 and selecting a first selected Transmit MAC memory entry group. Index k and index j are set to one. These indexes are used to repetitively scan the various Transmit MAC memory entry groups of the Transmit MAC memory unit. It is noted that index k can be set to another value, but it is assumed, for simplicity of explanation that the memory unit 150 is arranged such that the Transmit MAC memory entries groups are arrange in correspondence to the transmission order, thus simplifying the jump process between the different Transmit MAC memory entry units and simplifying the determination of when the scan process ends.

Stage 371 is followed by stage 373 of reading the j'th entry of the k'th Transmit MAC memory entry group in synchronization with LINE_TX_CLK1 191 and providing it to a transmission controller. The accessed entry includes a transmission instruction that is sent to the transmission controller.

Stage 373 is followed by stages 375 and 361. Stage 375 includes determining if the j'th entry is the last entry of the k'th Transmit MAC memory entry group. If the answer is negative stage 375 is followed by stage 376 of increasing index j: j=j+1. Stage 376 is followed by stage 373. Stages 373-376 scan the entire k'th Transmit MAC memory entry group.

If the answer is positive (the j'th entry of the k'th Transmit MAC memory entry group is the group) then stage 375 is followed by stage 377 of setting index j to one. Stage 377 is followed by stage 379 of determining whether to update k. The update can be responsive to the amount of repetition of the k'th frame that still needs to be transmitted. If index k is not updated then the previously scanned Transmit MAC memory entry group is scanned again. If the answer is positive then index k is updated. It is noted that non-consecutive ordering of the Transmit MAC memory entry groups can cause index k to be updated in other manners. Assuming that there are K different frames within the multi-frame then k is updated such that after the K'th frames index k returns to one. This is illustrated by using a modulo operation: k=Mod$_K$|k+1|.

Stage 381 is followed by stage 383 of determining if the multi-frame transmission ended. If the answer is positive then stage 383 is followed by stage 371, else it is followed by stage 373.

Stage 373 is followed by stage 361 of providing the retrieved transmission instruction to a selected transmitter (or transmission path) out of multiple transmitters (or transmission paths) and stage 363 of transmitting information in response to the transmission instruction, by the selected transmitter. Stage 363 is followed by stage 383.

According to an embodiment of the invention the scanning of a Transmit MAC memory entry group can be synchronized with timing signals such as intra-multi-frame synchronization signal IFRAME_TX_SYNC 199. Thus, stages 379 and 381 may be followed by stage 373 only after such a synchronizing signal is received. It is noted that the transmission of each frame can be synchronized but this is not necessarily so.

Figure 9:
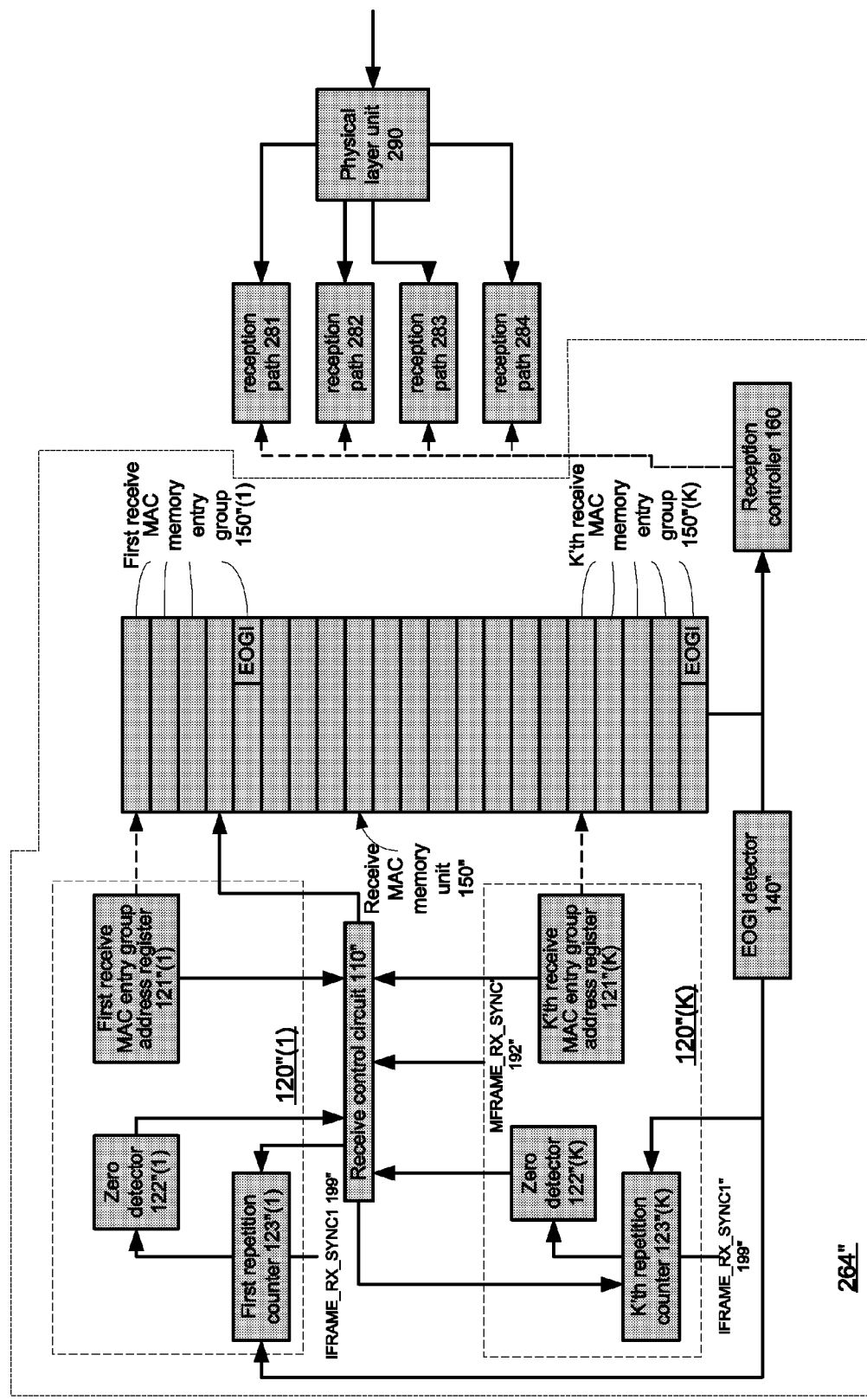
FIG. 9 illustrates a receive media access controller, according to another embodiment of the invention.

FIG. 9 illustrates a receive media access controller 264", according to an embodiment of the invention.

Receive media access controller 264" can be included within time slot assigner 264. The time slot assigner 264 can include additional circuits such as but not limited to a media access control circuit that controls the transmission of information to the communication line 20.

Receive media access controller 264" receives MFRAME_RX_SYNC1 192" that indicates that a reception of a multi-frame starts and is clocked by a reception communication line clock LINE_RX_CLK1" 191". In response to these signals the receive media access controller 264" scans, during a single multi-frame period, multiple receive MAC memory entry groups 150"(1)-150"(K) such as to retrieve reception instructions and in response to control the reception of information from the communication line. Each receive MAC memory entry group 150"(k) stores reception instructions that control a reception of a frame. During a single multi-frame reception period the receive media access controller 264" accesses at least twice one or more receive MAC memory entry group.

Receive media access controller 264" includes a receive memory unit 150", a receive control circuit 110", multiple receive frame access circuits 120"(1)-120"(K), a reception controller 160" and an end of group indicator (EOGI) detector 140".

The receive control circuit 110" is connected to the multiple receive frame access circuits 120"(1)-120"(K), and to the receive memory unit 150". The receive control circuit 110" scans, during a single multi-frame reception period, multiple receive MAC memory entry groups 150"(1)-150"(K). The retrieved reception instructions are sent to EOGI detector 140" and to reception controller 160".

Each receive MAC memory entry group 150"(k) stores reception instructions that control a reception of a frame. Index k ranges between 1 and K, whereas K represents the number of different frames that are included within a multi-frame. For simplicity of explanation only two receive MAC memory entry groups are illustrated (the first and the K'th MAC memory entry groups) but K can exceed two.

A typical receive frame access circuits (120"(k)) out of circuits 120"(1)-120"(K) is adapted to repetitively generate a media memory unit address sequence that corresponds to the address of entries that form an associated receive MAC memory entry group (150"(k)). The receive control circuit 110" is adapted to select between the multiple receive frame access circuits 120"(1)-120"(K).

Conveniently, each receive MAC memory entry group (150"(k)) ends by an end of group indicator (EOGI) and the EOGI detector 140" can detect an EOGI and in response notifies the receive control circuit 110". Receive control circuit 110" can receive this indication as well as other indications and can determine which is the next receive MAC memory entry group to scan.

First receive frame access circuit 120"(1) includes a first receive MAC entry group address register 121"(1) that stores the address of the first entry of the first receive MAC memory entry group 150"(1). This address is sent to the receive control circuit 110" whenever the receive control circuit 110" starts to scan the first receive MAC memory entry group 150"(1). The receive control circuit 110" scans the first receive MAC memory entry group by 150"(1) incrementing the addresses until the EOGI detector 140" detects that the end of the first receive MAC memory entry group 150"(1) was reached. Once it occurs the first receive repetition counter 123"(1) updates its value to reflect that the first receive MAC entry group was scanned. The inventors used a count down counter that its content was compared to zero (by zero detector 122"(1)) to indicate that a predefined number of scans of the first receive MAC memory entry group was completed. Once the predefined number of scans is completed the first receive repetition counter 123"(1) is updated to the initial predefined repetition number.

When the predefined number of scans of the first receive MAC memory entry group 150"(1) is completed the second receive frame access circuit 120"(2) is selected, and so on, until the K'th receive frame access circuit 120"(K) is selected by the receive control circuit 110", and the K'th receive MAC memory entry group 150"(K) is scanned for a predefined number of times. After the K'th receive MAC memory entry group 150"(K) is scanned for a predefined number of times the reception of the multi-frame ends and the receive media access controller 264" waits to receive the next MFRAME_RX_SYNC1" 192".

The memory outputs reception instructions to the EOGI detector 140" and to reception controller 160". The EOGI detector 140" looks for the EOGI field, while the reception controller 160" sends reception instructions to the reception controller 160".

The reception controller 160" sends reception instructions to reception paths such as paths 281-284 and in response these reception paths selectively receive information from the physical layer unit 290. For simplicity of explanation communication interface 170 and TMD ports 271 were omitted from FIG. 9.

It is noted that the reception instructions sent to reception controller 160" can differ from the reception instructions sent by the reception controller 160" to the reception paths. For example, if the reception controller 160" is connected to each reception path via a dedicated control line the reception instructions sent by the reception controller 160" to the reception paths do not necessarily include reception path identification information while conveniently the reception instructions sent to the reception controller 160" include such information. It is further noted that the changes can result from differences in the format of the reception instructions. The reception controller 160" can send only one reception instruction at a time but this is not necessarily so. The reception instructions can include reception start time information, although this is not necessarily so. Conveniently, a reception instruction defines the time slot allocated to each reception path.

According to an embodiment of the invention a scanning of a MAC memory entry group is synchronized by a synchronization signal MFRAME_TX_SYNC1".

Figure 10:
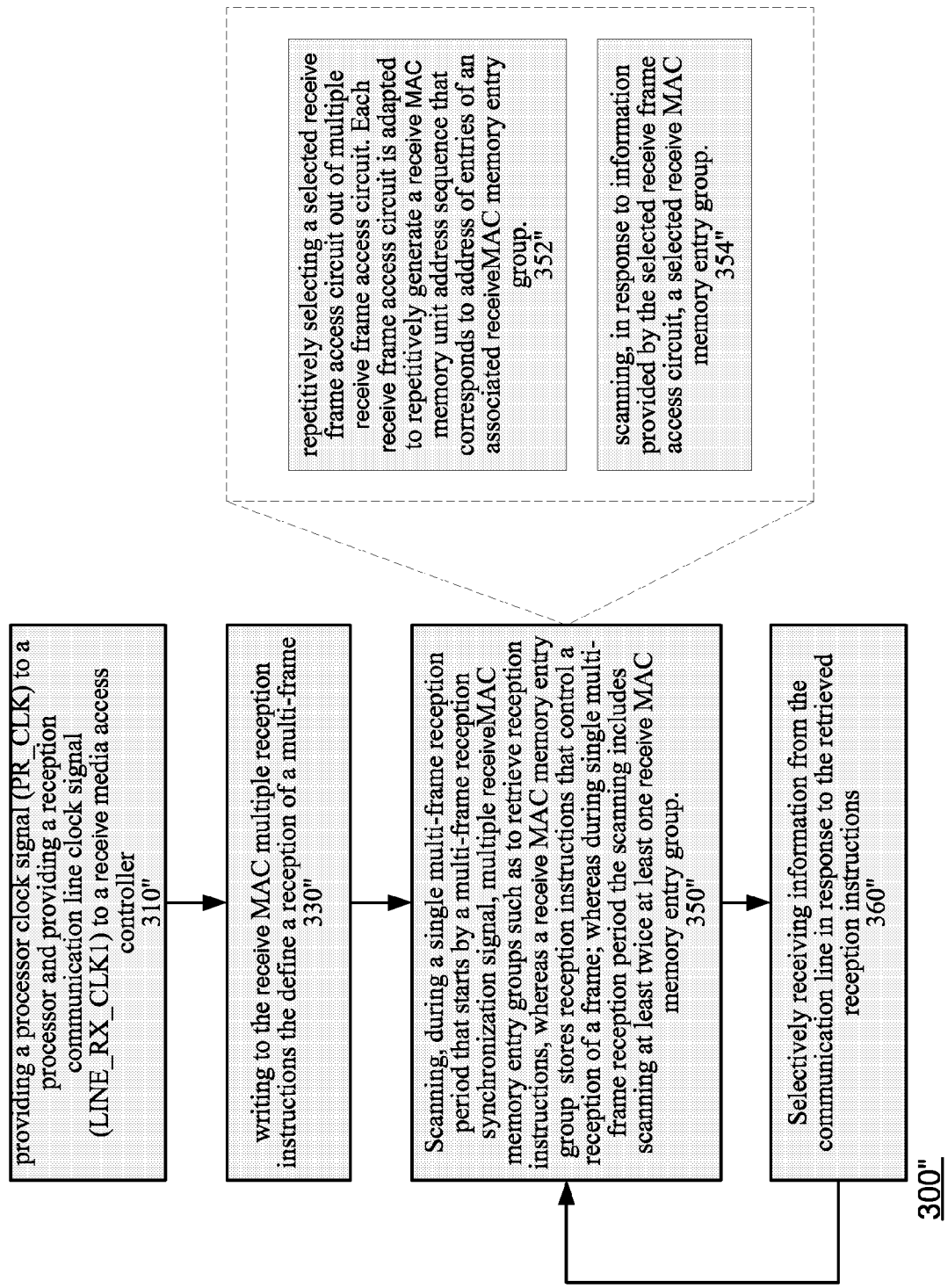
FIG. 10 is a flow chart of a method for receiving multi-frames, according to an embodiment of the invention.

FIG. 10 is a flow chart of method 300" for receiving multi-frames, according to an embodiment of the invention.

Method 300" starts by stage 310" of providing a processor clock signal PR_CLK 196 to a processor and providing a communication line receive clock signal LINE_RX_CLK1" 191" to a media access controller, such as receive media access controller 264".

Stage 310" is followed by stage 330" of writing, to the receive media access controller, multiple reception instructions that control a reception of a multi-frame. These reception instructions define time windows allocated to receivers.

Stage 330" is followed by stages 350" and 360".

Stage 350" includes scanning, during a single multi-frame period (that conveniently starts by a multi-frame reception synchronization signal MFRAME_RX_SYNC1"), multiple receive MAC memory entry groups such as to retrieve reception instructions. A receive MAC memory entry group stores reception instructions that control a reception of a frame. During a single multi-frame reception or more receive MAC memory entry groups are scanned multiple times.

Conveniently, stage 350" includes stage 352" of repetitively selecting a selected receive frame access circuit out of multiple receive frame access circuit. Each receive frame access circuit is adapted to repetitively generate a receive MAC memory unit address sequence that corresponds to address of entries of an associated receive MAC memory entry group. Stage 352" is followed by stage 354" of scanning, in response to information provided by the selected receive frame access circuit, a selected receive MAC memory entry group.

Conveniently, stage 350" includes searching for an end of group indicator (EOGI) indicative of an end of a currently scanned receive MAC entry group, and determining a next scanned receive MAC memory entry group in response to the detection of the EOGI.

Conveniently, stage 350" includes timing a scanning of at least one receive MAC memory entry group in response to a reception of an intra-multi-frame reception synchronization signal such as IFRAME_RX_SYNC1" 199" and detection of the EOGI.

Stage 360" includes selectively receiving information from the communication line, in response to the retrieved reception instructions.

Conveniently, stage 360" includes sending reception commands to multiple reception paths (also referred to as receivers) and allowing these receivers to receive information provided over the communication line.

Conveniently, stage 310" also includes providing a processor clock signal PR_CLK 196 to a second processor and providing a second reception communication line clock signal LINE_RX_CLK2" 197" to a second receive media access controller. Stage 330" of writing further includes writing to the second receive media access controller, multiple reception instructions that control a reception of a second multi-frame. Stage 350" of scanning further includes scanning, during a single multi-frame reception period that starts by a second multi-frame reception synchronization signal MFRAME_RX_SYNC2" 198", multiple second receive MAC memory entry groups such as to retrieve reception instructions. Stage 360" further includes selectively receiving information from a communication line, in response to the retrieved reception instructions. A second receive MAC memory entry group stores reception instructions that control a reception of a frame. During single multi-frame period the scanning includes scanning at least twice at least one receive MAC memory entry group.

Figure 11:
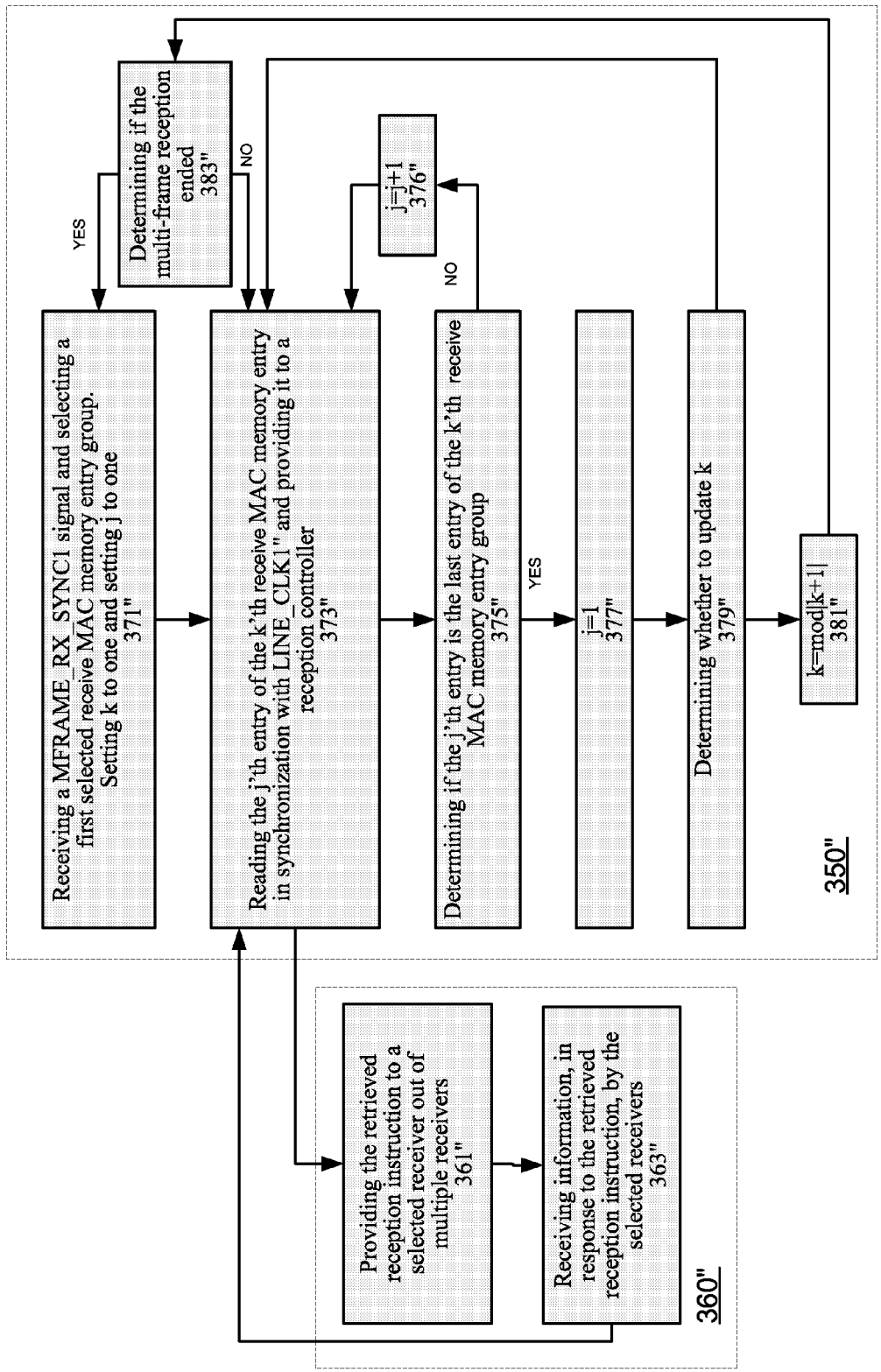
FIG. 11 illustrates various stages of the method for receiving multi-frames, according to an embodiment of the invention.

FIG. 11 illustrates various stages 350", 360" of method 300" for receiving multi-frames, according to an embodiment of the invention.

Stage 350" starts by stage 371" of receiving MFRAME_RX_SYNC1" 192" and selecting a first selected receive MAC memory entry group. Index k and index j are set to one. These indexes are used to repetitively scan the various receive MAC memory entry groups of the receive MAC memory unit. It is noted that index k can be set to another value, but it is assumed, for simplicity of explanation that the receive memory unit 150" is arranged such that the receive MAC memory entries groups are arrange in correspondence to the reception order, thus simplifying the jump process between the different receive MAC memory entry units and simplifying the determination of when the scan process ends.

Stage 371" is followed by stage 373" of reading the j'th entry of the k'th receive MAC memory entry group in synchronization with LINE_RX_CLK1" 191" and providing it to a reception controller. The accessed entry includes a reception instruction that is sent to the reception controller.

Stage 373" is followed by stages 375" and 361". Stage 375" includes determining if the j'th entry is the last entry of the k'th receive MAC memory entry group. If the answer is negative stage 375" is followed by stage 376" of increasing index j: j=j+1. Stage 376" is followed by stage 373". Stages 373"-376" scan the entire k'th receive MAC memory entry group.

If the answer is positive (the j'th entry of the k'th MAC memory entry group is the group) then stage 375" is followed by stage 377" of setting index j to one. Stage 377 is followed by stage 379" of determining whether to update k. The update can be responsive to the amount of repetition of the k'th frame that still needs to be transmitted. If index k is not updated then the previously scanned receive MAC memory entry group is scanned again. If the answer is positive then index k is updated. It is noted that non-consecutive ordering of the receive MAC memory entry groups can cause index k to be updated in other manners. Assuming that there are K different frames within the multi-frame then k is updated such that after the K'th frames index k returns to one. This is illustrated by using a modulo operation: k=Mod$_K$|k+1|.

Stage 381" is followed by stage 383: of determining if the multi-frame reception ended. If the answer is positive then stage 383" is followed by stage 371", else it is followed by stage 373".

Stage 373" is followed by stage 361" of providing the retrieved reception instruction to a selected receiver (or reception path) out of multiple receivers (or reception paths) and stage 363" of receiving information in response to the reception instruction, by the selected receiver. Stage 363" is followed by stage 383".

According to an embodiment of the invention the scanning of a receive MAC memory entry group can be synchronized with timing signals such as intra-multi-frame reception synchronization signal IFRAME_RX_SYNC" 199". Thus, stages 379" and 381" may be followed by stage 373" only after such a synchronizing signal is received. It is noted that the reception of each frame can be synchronized but this is not necessarily so.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device, comprising:
a processor coupled to a communication line via a physical layer unit, the physical layer unit configured to generate a communication line transmit clock signal and a multi-frame transmission synchronization signal; and
a transmit media access controller (MAC) coupled to the physical layer unit wherein the transmit MAC is configured to receive the multi-frame transmission synchronization signal and the communication line transmit clock signal, and in response to scan, during a single multi-frame transmission period, multiple transmit MAC memory entry groups within the transmit MAC to retrieve transmission instructions and in response to enable access to the communication line;
wherein each transmit MAC memory entry group stores transmission instructions that control a transmission of a frame;
wherein during the single multi-frame transmission period the transmit MAC accesses one transmit MAC memory entry group at least two times;
wherein the processor is configured to generate the transmission instructions; and
wherein the processor receives a processor clock signal that differs from the communication line transmit clock signal.

2. The device, according to claim 1 wherein the physical layer unit is configured to generate a communication line reception clock signal and a multi-frame reception synchronization signal; and wherein the device comprises a media access controller coupled to the physical layer unit wherein the MAC is configured to receive the multi-frame reception synchronization signal and the communication line reception clock signal, and in response to scan, during a single multi-frame period, multiple receive MAC memory entry groups such as to retrieve reception instructions and in response selectively receive information from the communication line; wherein each receive MAC memory entry group stores reception instructions that control a reception of a frame; wherein during a single multi-frame reception period the MAC accesses at least twice at least one MAC memory entry group; wherein the processor is configured to generate the multiple reception instructions; and wherein the processor receives a processor clock signal that differs from a communication line reception clock signal.

3. The device according to claim 2, wherein each transmit MAC memory entry group ends by an end of group indicator (EOGI); and wherein the transmit MAC is configured to locate a EOGI of a currently scanned transmit MAC memory entry group and in response to determine a next scanned transmit MAC memory entry group.

4. The device according to claim 1 wherein each transmit MAC memory entry group ends by an end of group indicator (EOGI), and wherein the transmit MAC is configured to locate a EOGI of a current scanned transmit MAC memory entry group and in response to determine a next scanned transmit MAC memory entry group.

5. The device according to claim 4 wherein the transmit MAC comprises a transmit MAC memory unit, a transmit control circuit that scans the transmit MAC memory unit, and a transmission controller configured to control access to the communication line in response to the retrieved transmission instructions.

6. The device according to claim 4 wherein the transmit MAC comprises multiple transmit frame access circuits wherein each transmit frame access circuit is configured to repetitively generate a transmit MAC memory unit address sequence that corresponds to address of entries of an associated transmit MAC memory entry group; and wherein the transmit control circuit is configured to select between the multiple transmit frame access circuits.

7. The device according to claim 4, wherein the device further comprises:
a time slot assigner coupled to a second communication line via a second physical layer unit;
the second physical layer unit configured to generate a second communication line transmit clock signal and a second multi-frame transmission synchronization signal;
a second transmit MAC configured to receive the second multi-frame transmission synchronization signal and in response to scan, during a single multi-frame transmission period, multiple second transmit MAC memory entry groups such as to retrieve transmission instructions and in response to enable access to the second communication line; wherein each second transmit MAC memory entry group stores transmission instructions that control a transmission of a frame; and wherein during the single multi-frame transmission period the second transmit MAC accesses one transmit MAC memory entry group at least two times; and
a second processor configured to generate the multiple transmission instructions;
wherein the second processor receives a processor clock signal that differs from the second communication line transmit clock signal.

8. The device according to claim 7 wherein the second transmit MAC comprises a second transmit MAC memory unit, a second transmit control circuit that scans the second transmit MAC memory unit, and a second transmission instruction controller, configured to control access to the second communication line in response to the retrieved transmission instructions.

9. The device according to claim 8 wherein the second transmit MAC comprises multiple transmit frame access circuits, wherein each transmit frame access circuit is configured to repetitively generate a transmit MAC memory unit address sequence that correspond to address of entries of an associated second transmit MAC memory entry group and wherein the second transmit control circuit is configured to select between the multiple transmit frame access circuits.

10. The device according to claim 4 wherein the transmit MAC is coupled to multiple transmitters and wherein the transmit MAC sends transmission commands to the multiple transmitters that determine an access of each transmitter to the communication line.

11. The device according to claim 4 wherein the transmit MAC is further configured to receive an intra-multi-frame transmission synchronization signal and to synchronize the scanning with the intra-multi-frame transmission synchronization signal and the multi-frame transmission synchronization signal.

12. The device according to claim 4, wherein a receive MAC comprises a receive MAC memory unit, a control circuit that scans the receive MAC memory unit and a reception controller, configured to control reception of information from the communication line in response to the retrieved reception instructions.

13. A method for transmitting multi-frames, the method comprises:
    providing a processor clock signal to a processor and providing a communication line clock signal to a transmit media access controller (MAC);
    writing, to the transmit MAC, multiple transmission instructions that control a transmission of a multi-frame; and
    scanning, during a single multi-frame transmission period that starts by a multi-frame synchronization signal, multiple transmit MAC memory entry groups within the transmit MAC to receive transmission instructions and in response to enabling access to the communication line;
    wherein a transmit MAC memory entry group stores transmission instructions that control a transmission of a frame; and
    wherein during the single multi-frame transmission period the scanning comprises scanning one transmit MAC memory entry group at least two times.

14. The method according to claim 13, wherein the providing further comprises providing the processor clock signal to a second processor and providing a second communication line transmission clock signal to a second transmit media access controller MAC; wherein the writing further; comprises writing to the second transmit MAC, multiple transmission instructions that control a transmission of a second multi-frame; wherein the scanning further comprises scanning during a single multi-frame transmission period that starts by a second multi-frame transmission synchronization signal, multiple second transmit MAC memory entry groups such as to retrieve transmission instructions and in response enabling access to the second communication line; wherein a second transmit MAC memory entry group stores transmission instructions that control a transmission of a frame; and wherein during the single multi-frame transmission period the scanning comprises scanning at least two times one transmit MAC memory entry group.

15. The method according to claim 13 wherein the scanning comprises searching for an end of group indicator (EOGI) indicative of an end of a currently scanned transmit MAC entry group; and determining a next scanned transmit MAC memory entry group in response to the detection of the EOGI.

16. The method according to claim 15 wherein the scanning comprises repetitively selecting a selected transmit frame access circuit out of multiple transmit frame access circuit; wherein each transmit frame access circuit is configured to repetitively generate a transmit MAC memory unit address sequence that correspond to address of entries of an associated transmit MAC memory entry group; and scanning, by the selected transmit frame access circuit a selected transmit MAC memory entry group.

17. The method according to claim 15, wherein the enabling comprises sending transmission commands to multiple transmitters and conveying information provided by the multiple transmitters to the communication line.

18. The method according to claim 15, further comprising timing a scanning of at least one transmit MAC memory entry group in response to a reception of an intra-multi-frame transmission synchronization signal.

19. The method according to claim 14, further comprising scanning, during a single receive multi-frame period that starts by a multi-frame receive synchronization signal, multiple MAC memory entry groups such as to retrieve reception instructions and in response selectively receiving information from the communication line;
    wherein a receive MAC memory entry group stores reception instructions that control a reception of a frame;
    wherein during the single multi-frame receive period the scanning comprises scanning at least twice at least one receive MAC memory entry group.

20. A method for transmitting multi-frames, the method comprising:
    providing a processor clock signal to a processor, and providing a communication line clock signal to a transmit media access controller (MAC);
    writing, to the transmit MAC, multiple transmission instructions that control a transmission of a multi-frame; and
    scanning, during a single multi-frame transmission period that starts by a multi-frame synchronization signal, multiple transmit MAC memory entry groups such as to receive transmission instructions and in response to enabling access to the communication line;
    wherein a transmit MAC memory entry group stores transmission instructions that control a transmission of a frame;
    wherein during the single multi-frame transmission period the scanning includes scanning one transmit MAC memory entry group at least two times; and
    wherein the scanning comprises searching for an end of group indicator (EOGI) indicative of an end of a currently scanned transmit MAC entry group; and determining a next scanned transmit MAC memory entry group in response to the detection of the EOGI.

* * * * *